(12) United States Patent
Fowler et al.

(10) Patent No.: US 11,326,880 B2
(45) Date of Patent: *May 10, 2022

(54) STRAPDOWN HEADING SENSORS AND SYSTEMS, AND METHODS OF CALIBRATING AND COMPENSATING THE SAME

(71) Applicant: TIAX LLC, Lexington, MA (US)

(72) Inventors: J. Thomas Fowler, Lexington, MA (US); Matthew C. Wiggins, Concord, MA (US); Vernon E. Shrauger, Cambridge, MA (US)

(73) Assignee: TIAX LLC, Lexington, MA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/945,071

(22) Filed: Jul. 31, 2020

(65) Prior Publication Data
US 2020/0408522 A1    Dec. 31, 2020

Related U.S. Application Data

(60) Division of application No. 16/245,433, filed on Jan. 11, 2019, now Pat. No. 10,823,567, which is a
(Continued)

(51) Int. Cl.
*G01C 17/38* (2006.01)
*G01C 21/16* (2006.01)
*G01C 17/02* (2006.01)

(52) U.S. Cl.
CPC ............ *G01C 17/38* (2013.01); *G01C 17/02* (2013.01); *G01C 21/16* (2013.01)

(58) Field of Classification Search
CPC ...... G01C 21/16; G01C 21/165; G01C 21/18; G01C 17/38
(Continued)

(56) References Cited

U.S. PATENT DOCUMENTS

| 2,144,422 | A | 1/1939 | Anderson |
| 2,213,832 | A | 9/1940 | Braddon |

(Continued)

OTHER PUBLICATIONS

F. Camps et al. "Numerical Calibration for 3-Axis Accelerometers and Magnetometers" Electro/Information Technology, 2009; IEEE International Conference, Jun. 7-9, 2009; Printed ISBN: 978-1-4244-335-1/09; pp. 217-221.
(Continued)

*Primary Examiner* — John Fitzgerald
*Assistant Examiner* — Rodney T Frank
(74) *Attorney, Agent, or Firm* — Cantor Colburn LLP

(57) ABSTRACT

Methods of calibrating strapdown heading sensors and strapdown heading sensors are provided. The methods include compensating raw sensor data generated by sensors of an uncalibrated strapdown heading sensor to compensate for errors in an instrument frame of the strapdown heading sensor. The strapdown heading sensor is put in a target apparatus and output data is compensated to compensate for errors in an apparatus frame relative to the instrument frame. The strapdown heading sensors include a housing and a compass module having a first sensor configured to detect a magnetic field of the Earth and a second sensor configured to detect a gravitational force of the Earth. The first sensor and the second sensor are each passively isolated from bending and/or flexing of the housing such that an alignment between the first sensor and the second sensor is not disturbed due to the bending and/or flexing.

19 Claims, 10 Drawing Sheets

Related U.S. Application Data division of application No. 14/564,657, filed on Dec. 9, 2014, now Pat. No. 10,209,068, which is a continuation of application No. 13/173,711, filed on Jun. 30, 2011, now Pat. No. 8,931,326.

(60) Provisional application No. 61/398,917, filed on Jul. 2, 2010.

(58) Field of Classification Search
USPC .............................................. 73/1.76, 178 R
See application file for complete search history.

(56) References Cited

U.S. PATENT DOCUMENTS

| | | |
|---|---|---|
| 2,364,908 A | 12/1944 | Miller |
| 3,289,475 A | 12/1966 | Kenyon |
| 3,330,155 A | 7/1967 | Miville |
| 3,840,726 A | 10/1974 | Harrison |
| 4,505,048 A | 3/1985 | Sharp |
| 4,570,353 A | 2/1986 | Evans et al. |
| 4,698,912 A | 10/1987 | Fowler et al. |
| 4,831,544 A | 5/1989 | Hojo et al. |
| 6,418,082 B1 | 7/2002 | Hollis et al. |
| 7,555,398 B2 | 6/2009 | Fowler |
| 10,209,068 B2 * | 2/2019 | Fowler .................. G01C 17/38 |

OTHER PUBLICATIONS

Gebre-Egziabher et al. "Calibration of Strapdown Magnetometers in Magnetic Field Domain" Journal of Aerospace Engineering; vol. 19; No. 2; Apr. 2006; pp. 87-102.

* cited by examiner

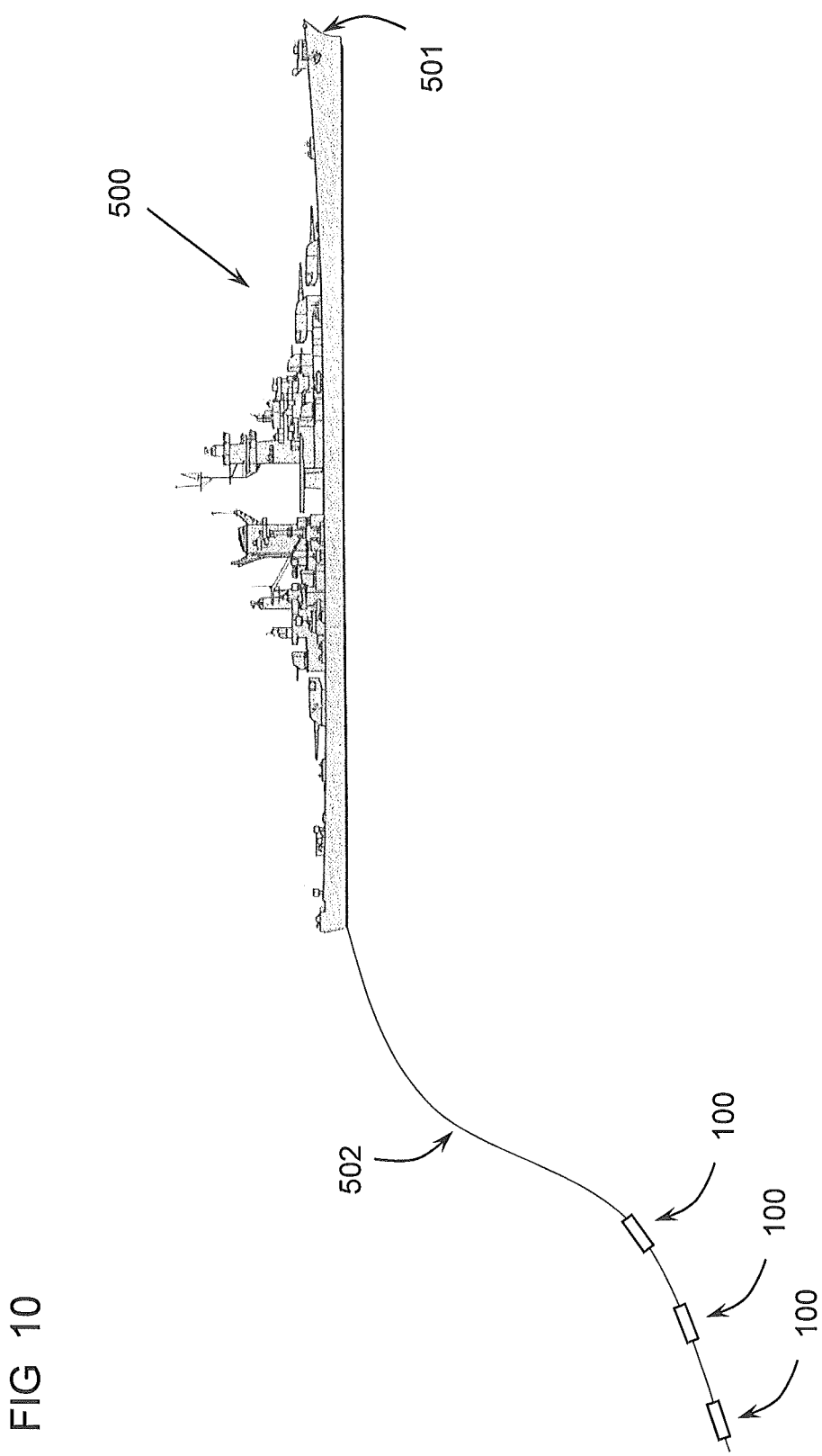

STRAPDOWN HEADING SENSORS AND SYSTEMS, AND METHODS OF CALIBRATING AND COMPENSATING THE SAME

CROSS-REFERENCE TO RELATED APPLICATIONS

The present application is a Divisional of U.S. application Ser. No. 16/245,433, filed Jan. 11, 2019, which is a Divisional of U.S. application Ser. No. 14/564,657 (U.S. Pat. No. 10,209,068), filed Dec. 9, 2014, which is a Continuation of U.S. application Ser. No. 13/173,711 (U.S. Pat. No. 8,931,326), filed on Jun. 30, 2011, which claims the benefit of an earlier filing date from U.S. Provisional Application No. 61/398,917, filed on Jul. 2, 2010, the contents of which are herein incorporated by reference in their entireties.

TECHNICAL FIELD

The present application generally relates to heading sensors, and more particularly, to strapdown heading sensors and systems, and methods of calibrating and compensating strapdown heading sensors and systems.

BACKGROUND

Heading sensors have a variety of uses. For example, heading sensors may be employed in vehicles, projectiles, towed arrays and/or other devices requiring heading information. However, solid-state electronic devices included in heading sensors can be affected by environmental conditions and component variations, which can limit the accuracy of the heading sensors. In addition, on-axis errors, intra-axis errors and/or intra-sensor errors may further limit the accuracy of the heading sensors.

SUMMARY

Embodiments of the present inventive concepts are directed to strapdown heading sensors and systems, and methods of calibrating and compensating strapdown heading sensors and systems.

According to some embodiments, methods of calibrating strapdown heading sensors are provided. The methods include compensating raw sensor data generated by sensors of an uncalibrated strapdown heading sensor to compensate for errors in an instrument frame of the strapdown heading sensor, providing the strapdown heading sensor in a target apparatus, and after providing the strapdown heading sensor in the target apparatus, compensating output data of the strapdown heading sensor to compensate for errors in an apparatus frame of the target apparatus relative to the instrument frame of the strapdown heading sensor. The strapdown heading sensor includes a housing and a compass module at least partially positioned within an inner cavity of the housing, the compass module including a first sensor configured to detect a magnetic field of the Earth and a second sensor configured to detect a gravitational force of the Earth. The compass module is structurally isolated from the housing such that the first sensor and the second sensor are passively isolated from at least one of bending and flexing of the housing, wherein an alignment between the first sensor and the second sensor is not disturbed due to the at least one of bending and flexing of the housing.

In addition to one or more of the features described above, or as an alternative, further embodiments of the methods may include that compensating raw sensor data generated by sensors of an uncalibrated strapdown heading sensor include applying test conditions to the uncalibrated strapdown sensor, computing compensation coefficients based on raw sensor data generated by the uncalibrated strapdown sensor and reference data determined from a known reference source, and compensating the raw sensor data so that compensated sensor data generated by the strapdown heading sensor corresponds to a physical orientation of the strapdown heading sensor.

In addition to one or more of the features described above, or as an alternative, further embodiments of the methods may include that the known reference source is generated by a reference sensor.

In addition to one or more of the features described above, or as an alternative, further embodiments of the methods may include that the applying test conditions to the uncalibrated strapdown sensor includes at least one of: varying a temperature of the uncalibrated strapdown heading sensor, varying an orientation of the uncalibrated strapdown heading sensor, varying magnetic field applied to the uncalibrated strapdown heading sensor, and altering a position of the uncalibrated strapdown heading sensor so as to affect a gravitational field applied to the uncalibrated strapdown heading sensor.

In addition to one or more of the features described above, or as an alternative, further embodiments of the methods may include that providing the strapdown heading sensor in a target apparatus introduces the errors in the apparatus frame relative to the strapdown heading sensor.

In addition to one or more of the features described above, or as an alternative, further embodiments of the methods may include that compensating output data of the strapdown heading sensor includes applying test conditions to the strapdown sensor provided in the target apparatus, computing compensation coefficients based on sensor data generated by the strapdown sensor and reference data determined from a known reference source, and compensating the sensor data so that compensated sensor data generated by the strapdown heading sensor corresponds to a physical orientation of the target apparatus.

According to some embodiments, strapdown heading sensors are provided. The strapdown heading sensors include a housing and a compass module at least partially positioned within an inner cavity of the housing, the compass module including a first sensor configured to detect a magnetic field of the Earth and a second sensor configured to detect a gravitational force of the Earth. The compass module is structurally isolated from the housing such that the first sensor and the second sensor are passively isolated from at least one of bending and flexing of the housing, wherein an alignment between the first sensor and the second sensor is not disturbed due to the at least one of bending and flexing of the housing.

In addition to one or more of the features described above, or as an alternative, further embodiments of the strapdown heading sensors may include that the housing is an elongated housing.

In addition to one or more of the features described above, or as an alternative, further embodiments of the strapdown heading sensors may include that the first sensor is a fluxgate sensor.

In addition to one or more of the features described above, or as an alternative, further embodiments of the strapdown heading sensors may include that the second sensor is an accelerometer.

In addition to one or more of the features described above, or as an alternative, further embodiments of the strapdown heading sensors may include that the compass module is cantilevered within the housing.

In addition to one or more of the features described above, or as an alternative, further embodiments of the strapdown heading sensors may include that the fluxgate magnetometer system is a tri-axial system.

In addition to one or more of the features described above, or as an alternative, further embodiments of the strapdown heading sensors may include that the fluxgate magnetometer system includes a plurality of uni-axial fluxgate magnetometers, the plurality of uni-axial fluxgate magnetometers being arranged transversely to one another.

In addition to one or more of the features described above, or as an alternative, further embodiments of the strapdown heading sensors may include that the fluxgate magnetometer system comprises three uni-axial mangetometers which are transversely arranged to one another.

In addition to one or more of the features described above, or as an alternative, further embodiments of the strapdown heading sensors may include that the fluxgate magnetometer system includes three uni-axial fluxgate magnetometers, each of which is configured to detect a different magnetic field vector.

In addition to one or more of the features described above, or as an alternative, further embodiments of the strapdown heading sensors may include that the at least one accelerometer is a uni-axial accelerometer.

In addition to one or more of the features described above, or as an alternative, further embodiments of the strapdown heading sensors may include that the at least one accelerometer includes a plurality of uni-axial accelerometers, the plurality of uni-axial accelerometers being arranged transversely to one another.

In addition to one or more of the features described above, or as an alternative, further embodiments of the strapdown heading sensors may include that the at least one accelerometer includes three uni-axial accelerometers, each of which is configured to detect a different acceleration vector.

In addition to one or more of the features described above, or as an alternative, further embodiments of the strapdown heading sensors may include that the at least one accelerometer is a bi-axial accelerometer.

In addition to one or more of the features described above, or as an alternative, further embodiments of the strapdown heading sensors may include that an alignment of axes within each of the first sensor and the second sensor is not disturbed due to the at least one of bending and flexing of the housing.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIG. 10 illustrates a towed array, in accordance with embodiments of the present inventive concepts.

DETAILED DESCRIPTION OF EMBODIMENTS

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc., may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Figure 1:
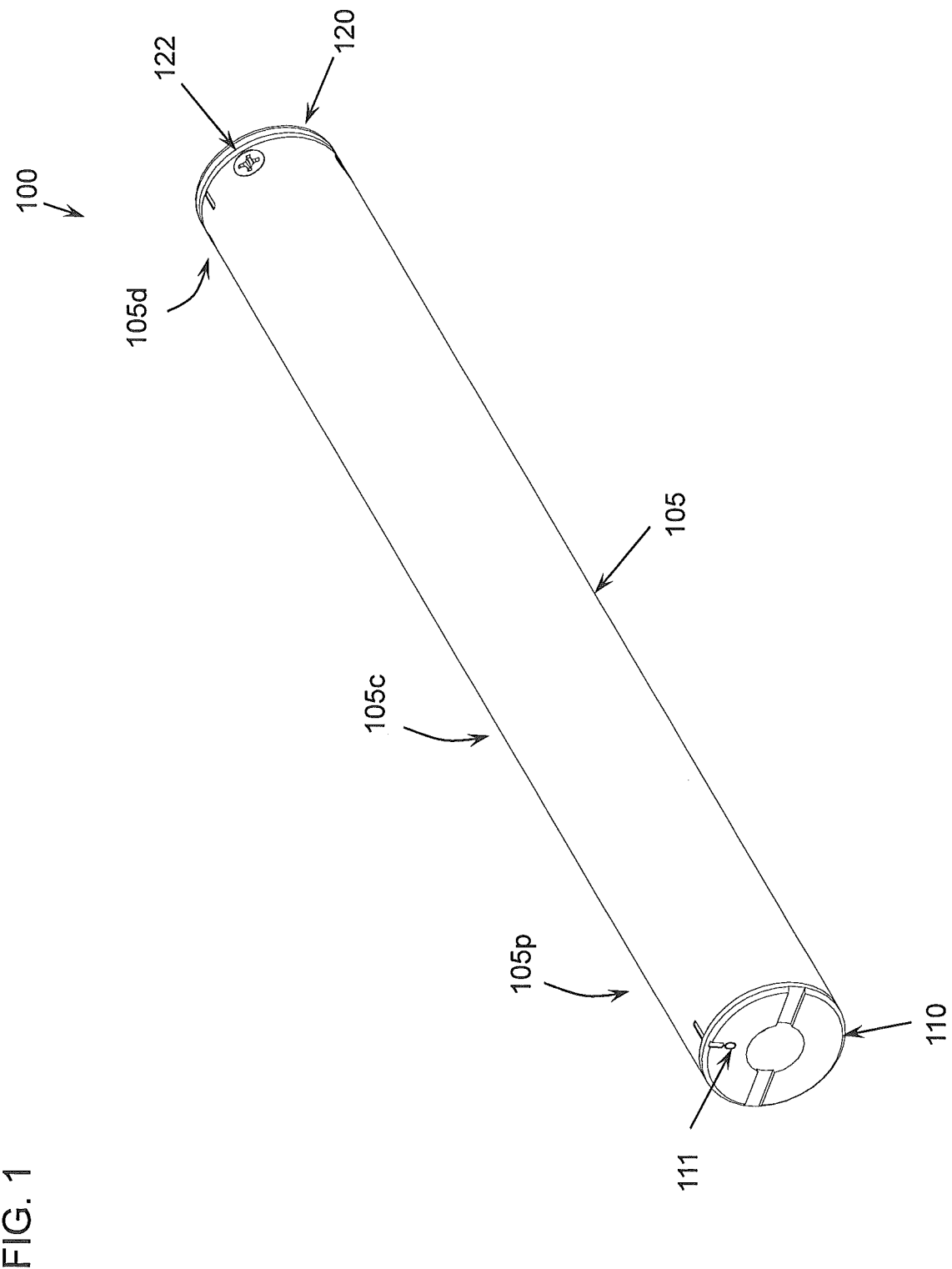
FIG. 1 is a perspective view of a strapdown heading sensor, in accordance with embodiments of the present inventive concepts.

FIG. 1 is a perspective view of a strapdown heading sensor, in accordance with embodiments of the present inventive concepts. A strapdown heading sensor 100 comprises an elongated housing 105 having a proximal end 105p, a central region 105c and a distal end 105d. The elongated housing 105 may be cylindrical or ellipsoidal in shape. In some embodiments, the elongated housing 105 may include a formed, milled or extruded tube. The elongated housing may include a metal material, a ceramic material or a plastic material. In some embodiments the elongated housing 105 may comprise aluminum, stainless steel, titanium, a non-magnetic material, or a combination thereof.

Further, the elongated housing 105 may include an opened housing or a closed housing. For example, the strapdown heading sensor 100 shown in FIGS. 1-4 includes an opened elongated housing 105 having a first opening at its proximal end 105p and a second opening at its distal end 150d. Alternatively, the strapdown heading sensor 100 shown in FIG. 5 includes a closed elongated housing 105 having a single opening at its proximal end 105p.

Referring to FIG. 1, the strapdown heading sensor 100 may further comprise first and second end caps 110, 120, which may be coupled to and/or press fit within the ends of the elongated housing 105. For example, the first end cap 110 may be coupled to the proximal end 105p of the elongated housing 105, and the second end cap 120 may be coupled to the distal end 105d of the elongated housing 105. One or more fasteners 122, such as screws, rivets or bolts, may be provided to securely fasten the first and second end caps 110, 120 to the elongated housing 105. However, alternatively or additionally, a glue, epoxy or sealant may be provided to couple the first and second end caps 110, 120 to the elongated housing 105. In some embodiments, the first and second end caps 110, 120 may be shrink fit within the ends of the elongated housing.

The first end cap 110 may include an alignment notch 111 or other type of marking that indicates the instrument frame of the strapdown heading sensor 100.

Figure 2:
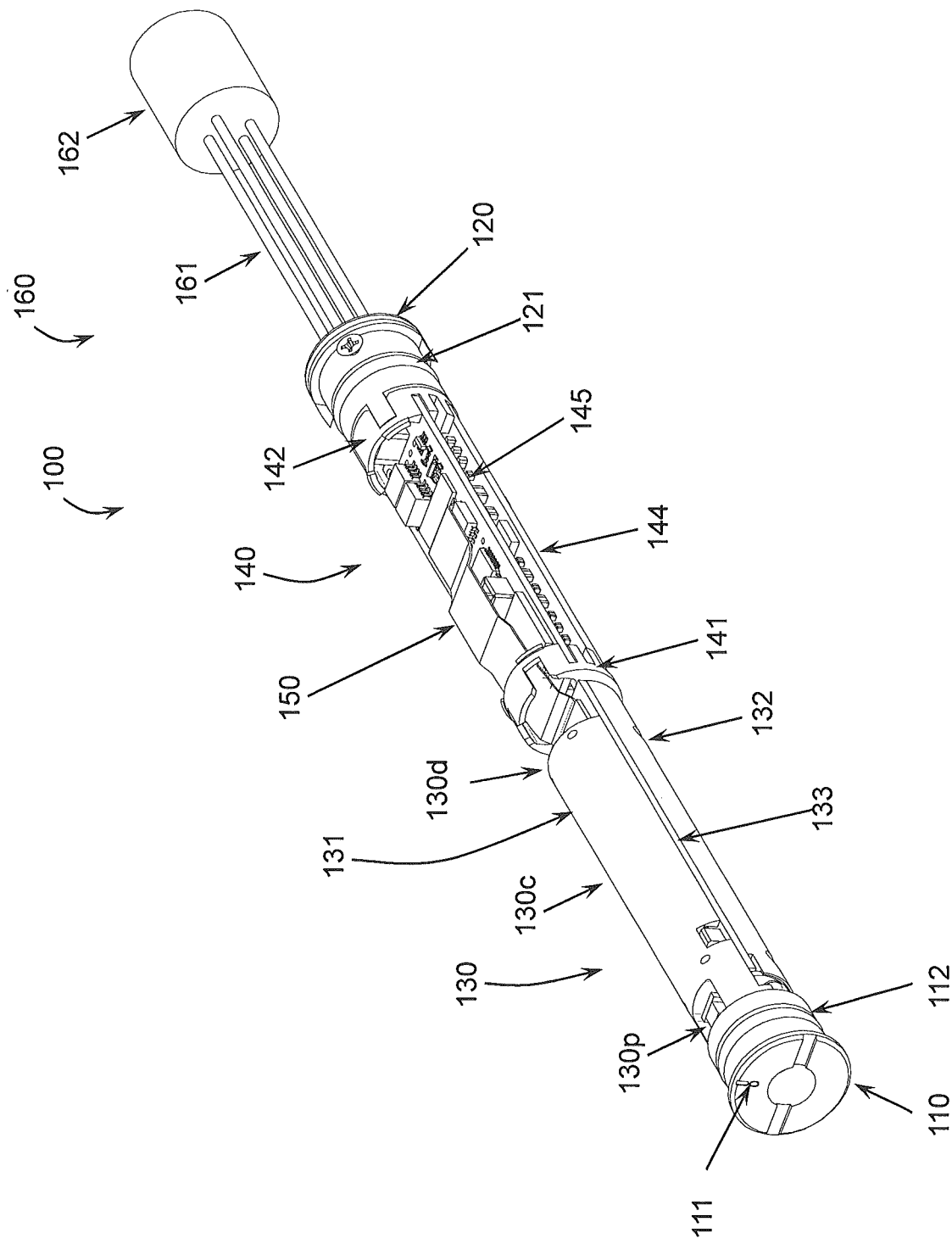
FIG. 2 is an internal perspective view of the strapdown heading sensor shown in FIG. 1, in accordance with embodiments of the present inventive concepts.
Figure 3:
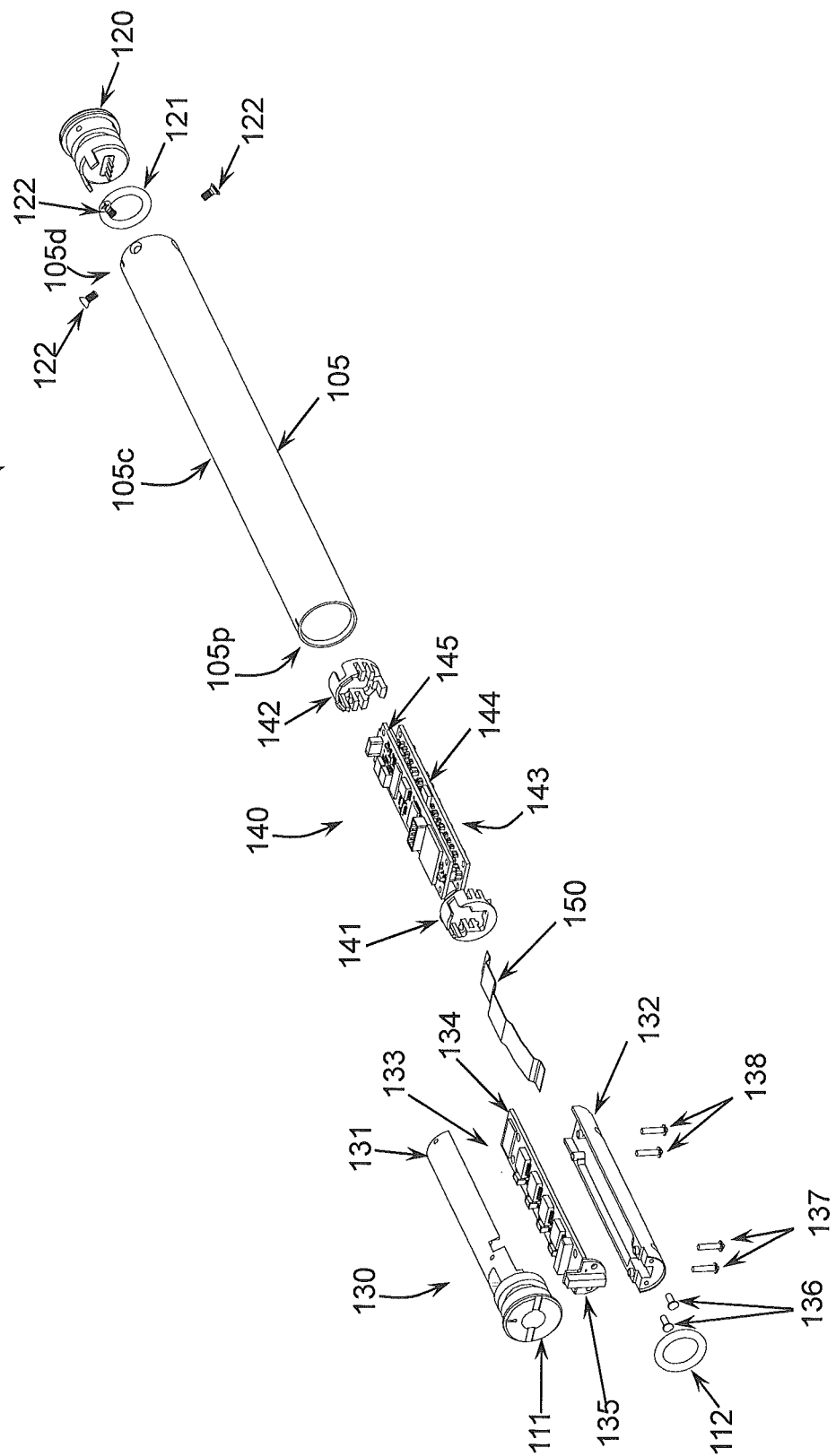
FIG. 3 is an exploded perspective view of the strapdown heading sensor shown in FIG. 1, in accordance with embodiments of the present inventive concepts.
Figure 4:
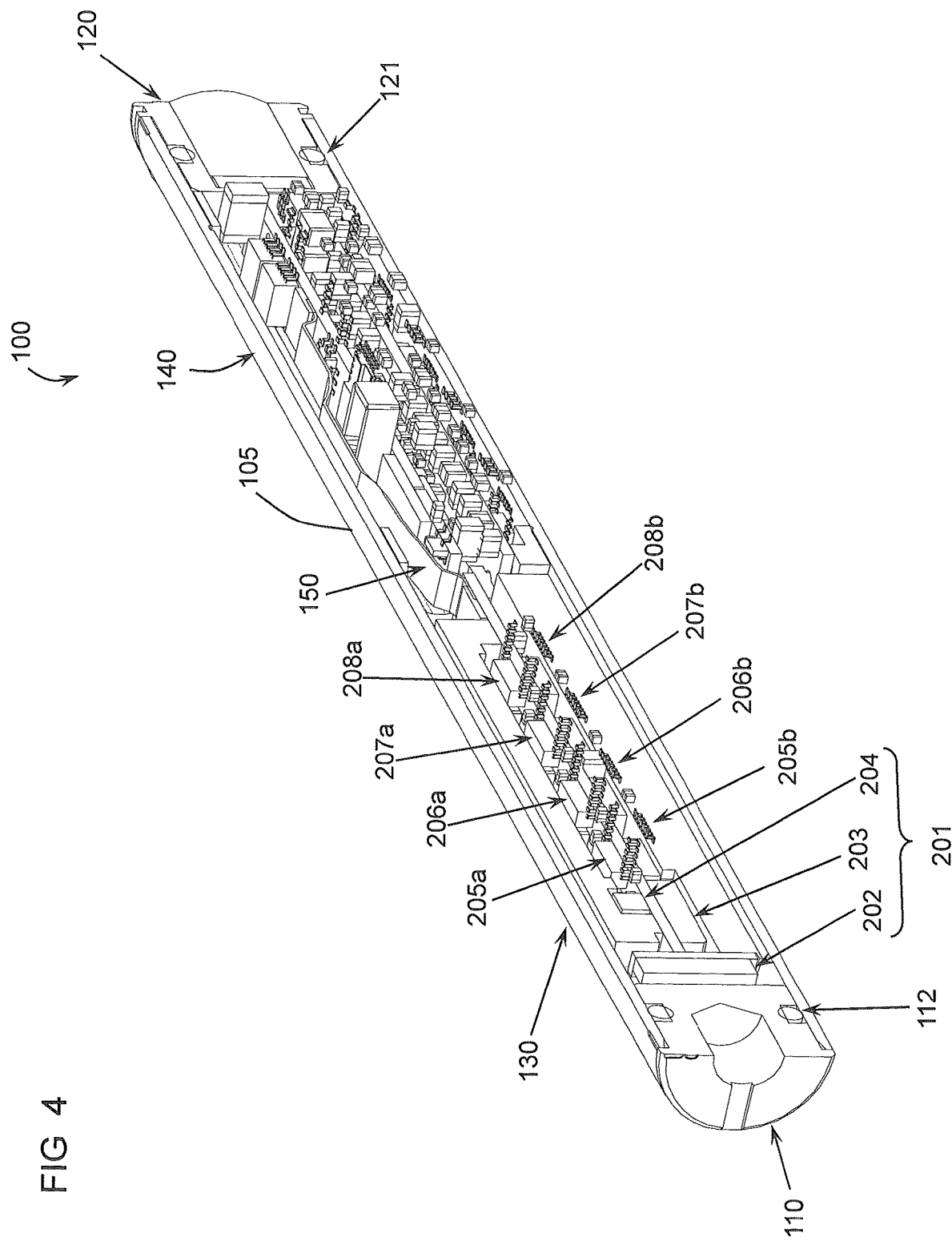
FIG. 4 is a cross-sectional view of the strapdown heading sensor shown in FIG. 1, in accordance with embodiments of the present inventive concepts.

FIG. 2 is an internal perspective view of the strapdown heading sensor shown in FIG. 1, FIG. 3 is an exploded perspective view of the strapdown heading sensor shown in FIG. 1, and FIG. 4 is a cross-sectional view of the strapdown heading sensor shown in FIG. 1, in accordance with embodiments of the present inventive concepts. The strapdown heading sensor 100 comprises a compass module 130 and a processing module 140, each of which may be secured within an inner cavity of the elongated housing 105. The compass module 130 is configured to generate and output data signals corresponding to a strength and/or direction of the Earth's magnetic field, and may further generate and output data signals corresponding to a strength and/or direction of gravitational acceleration of the strapdown heading sensor 100. The processing module 140 is configured to determine at least one of pitch, roll and yaw of the strapdown heading sensor 100 based in part on the data signals output from the compass module 130. Data signals corresponding to pitch, roll and/or yaw may be provided to other systems and devices via an input/output (I/O) harness 160, which may include wiring 161 and a connector 162.

In the embodiment shown in FIGS. 1-4, the compass module 130 and the processing module 140 are structurally isolated from one another when mounted within the elongated housing 105. In this manner, solid state sensors (e.g., magnetometers and/or accelerometers) of the compass module 130 may be isolated from unwanted shocks and vibrations induced on the processing module 140.

In addition, the compass module 130 may be cantilevered within the inner cavity of the elongated housing 105 so that the solid state sensors of the compass module 130 stay in relative alignment with the alignment notch 111. As described below with reference to FIGS. 7-9, the strapdown heading sensor 100 may be calibrated to the instrument frame of the strapdown heading sensor, which may be indicated by the alignment notch 111. By cantilevering the compass module 130 within the inner cavity of the elongated housing 105, the calibration of the strapdown heading sensor relative to the alignment notch 111 may be maintained even during flexing or bending of the elongated housing 105. That is, a clearance space between the inner cavity walls of the elongated housing 105 and the cantilevered compass module 130 will allow the elongated housing 105 to flex and/or bend without disturbing the alignment of the compass module.

For example, a proximal end 130p of the compass module 130 may be coupled to a proximal end 105p of the elongated housing 105 so that a central region 130c and a distal end 130d of the compass module 130 may be suspended within a central region 105c of the inner cavity of the elongated housing 105. An o-ring 112 or other damper may be compressed between the first end-cap 110 of the compass module 130 and a surface of the inner cavity of the elongated housing 105 so as to seal the proximal end 105 of the elongated housing 105. In some embodiments, an o-ring and/or other damper may be provided to reduce shocks and vibrations induced on the compass module 130.

As described above, the first end-cap 110 of the compass module 130 may be press fit within the proximal end 105p of the elongated housing 105. In addition, the first end cap 110 may be integrally joined with a first member 131 of the compass module 130; however, in other embodiments the first end cap 110 may be a discrete element that may be coupled to the first member 131 of the compass module 130.

The compass module 130 includes a compass package 133 having solid-state sensors mounted thereon, and can be secured between first and second members 131, 132 of the compass module 130. The first and second members 131, 132 may be constructed and arranged to secure the compass package 133 within the elongated housing 105, and may further increase the structural integrity of the compass package 133. As such, the first and second members 131, 132 may prevent the compass package from warping due to external or internal temperature fluctuations. The first and second members 131, 132 may be secured together via fasteners 137, 138, such as screws, rivets or bolts. However, alternatively or additionally, a glue, epoxy or sealant may be provided to secure the first and second members 131, 132 together. The first and second members 131, 132 may comprise aluminum or other structurally rigid material.

The compass package 133 includes a fluxgate magnetometer system 201 and at least one accelerometer 205a-b, 206a-b, 207a-b, 208a-b. The fluxgate magnetometer system 201 and the at least one accelerometer 205a-b, 206a-b, 207a-b, 208a-b may be coupled to a substrate 134, such as a printed circuit board, interconnect structure or dielectric layer of the compass package 133. In some embodiments, the fluxgate magnetometer system 201 and the at least one accelerometer 205a-b, 206a-b, 207a-b, 208a-b are coupled to a single substrate 134; however, in other embodiments the fluxgate magnetometer system 201 and the at least one accelerometer 205a-b, 206a-b, 207a-b, 208a-b are coupled to multiple substrates 134, 135. For example, in the embodiment shown in FIGS. 2-4, a first fluxgate magnetometer 202 of the fluxgate magnetometer system 201 is coupled to a first substrate 135 of the compass package 133, and second and third fluxgate magnetometers 203, 204 of the fluxgate magnetometer system 201 are coupled to a second substrate 134 of the compass package 133. In some embodiments, the first substrate 135 is directly coupled to the second substrate 134; however, in other embodiments the first substrate 135 is coupled to the second member 132 of the compass module 130 via one or more fasteners 136.

The fluxgate magnetometer system 201 shown in FIG. 4 includes a tri-axial fluxgate magnetometer system including first through third uni-axial fluxgate magnetometers 202, 203, 204. The first through third uni-axial fluxgate magnetometers 202, 203, 204 are transversely coupled to the compass package 133 with respect to one another so as to detect three (3) different magnetic field vectors. However, in other embodiments the tri-axial fluxgate magnetometer system may include a single tri-axial fluxgate magnetometer device.

The compass package 133 may include one or more accelerometers or pairs of accelerometers 205a-b, 206a-b, 207a-b, 208a-b, which may include any number or combination of uni-axial, bi-axial or tri-axial accelerometers. In the embodiment shown in FIG. 4, a first accelerometer 205a of a pair of accelerometers 205a-b is coupled to a first side of the substrate 134 and a second accelerometer 205b of the pair of accelerometers 205a-b is coupled to a second side, opposite the first side, of the substrate 134. Second, third and fourth pairs of accelerometers 206a-b, 207a-b, 208a-b are shown coupled to the substrate 134 in similar fashion. However, in other embodiments the one or more accelerometers or pairs of accelerometers 205a-b, 206a-b, 207a-b, 208a-b may be coupled to a single side of the substrate 134.

In some embodiments, the compass package 133 may include one or more uni-axial accelerometers. For example, the compass package 133 may include first through third uni-axial accelerometers. The first uni-axial accelerometer may be constructed and arranged to detect a first acceleration vector. The second uni-axial accelerometer may be constructed and arranged to detect a second acceleration vector transverse to the first acceleration vector, and the third uni-axial accelerometer may be constructed and arranged to detect a third acceleration vector transverse to the first and second acceleration vector. The first through third uni-axial accelerometers may be coupled to a single side of the substrate 134. Alternatively, the first through third uni-axial accelerometers may be coupled to first through third substrates, respectively.

Alternatively or additionally, the compass package 133 may include one or more bi-axial accelerometers. For example, the compass package 133 may include first and second bi-axial accelerometers. The first bi-axial accelerometer may be constructed and arranged to detect first and second acceleration vectors. The first acceleration vector may be transverse to the second acceleration vector. The second bi-axial accelerometer may be constructed and arranged to detect the third and fourth acceleration vectors. The third acceleration vector may be transverse to the fourth acceleration vector. In some embodiments, the second and third acceleration vectors may be collinear; however, in other embodiments, the second acceleration vector may be transverse to the third acceleration vector. Alternatively or additionally, the compass package 133 may include one or more tri-axial accelerometers.

Regardless of the type of accelerometer, each accelerometer of the strapdown heading sensor may be coupled to a single substrate 134 or a plurality of individual substrates, which may be secured between the members 131, 132 of the compass module 130.

The strapdown heading sensor 100 further comprises a flexible cable 150. The flexible cable 150 electrically couples the compass module 130 to the processing module 140, and may further help to reduce the transfer of mechanical stresses and/or vibrations from the processing module 140 to the compass module 130.

The processing module 140 may include a single processing package, or alternatively, the processing module 140 may include first and second processing packages 144, 145. The single processing package or the first and second processing packages 144, 145 may be suspended within the interior of the elongated housing by first and second suspension caps 141, 142.

Figure 5:
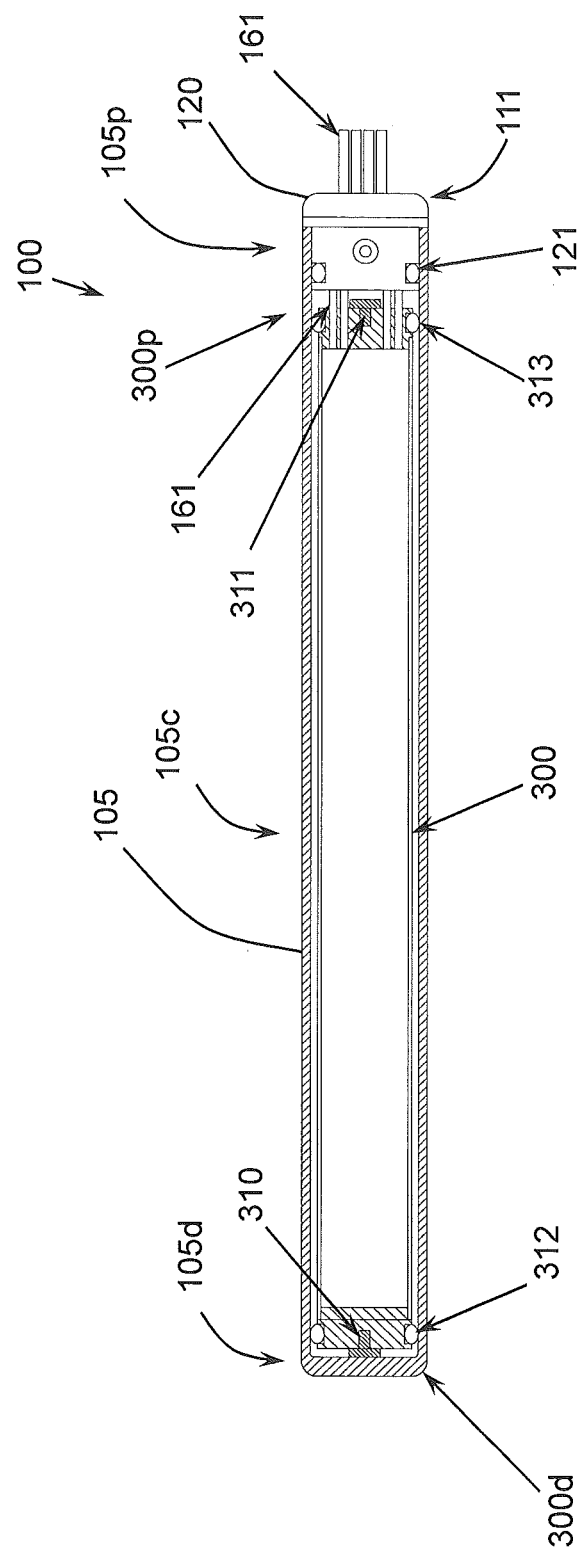
FIG. 5 is a perspective view of another strapdown heading sensor, in accordance with embodiments of the present inventive concepts.

FIG. 5 is a perspective view of another strapdown heading sensor, in accordance with embodiments of the present inventive concepts. The strapdown heading sensor 100 shown in FIG. 5 may include any of the devices, systems, elements or features of the strapdown heading sensor shown and described above with reference to FIGS. 1-4.

As described above, the strapdown heading sensor 100 shown in FIG. 5 includes a closed elongated housing 105 having a single opening at its proximal end 105p, which can be closed by an end cap 120. A combined compass and processing module 300 may be positioned within the inner cavity of the elongated housing 105, and may further be sealed and/or secured therein. For example, the combined compass and processing module 300 may be suspended within the inner cavity of the elongated housing 105. Although the combined compass and processing module 300 is shown positioned within the inner cavity of a closed housing, the combined compass and processing module 300 may alternatively be positioned within an open housing, such as the open housing shown in FIGS. 1-4.

The strapdown heading sensor 100 is constructed and arranged to passively isolate the combined compass and processing module 300 from vibrations induced on an outer surface of the elongated housing 105. To achieve this result, the combined compass and processing module 300 may be suspended within the inner cavity of the elongated housing 105 by one or more dampers, such as an o-ring 312, 313 and/or bumper 310, 311. For example, in the embodiment shown in FIG. 5, first and second o-rings 312, 313 are provided at proximal and distal ends 300p, 300d of the combined compass and processing module 300 so as to reduce the transfer of vibrations from the elongated housing 105 to the combined compass and processing module 300. In addition, first and second bumpers 310, 311 may be provided at ends of the combined compass and processing module 300 to further reduce unwanted vibrations.

The combined compass and processing module 300 includes a compass package and a processing package. The compass package may include a fluxgate magnetometer system and at least one accelerometer or pair of accelerometers, and the processing package may include control circuitry configured to determine at least one of pitch, roll and yaw of the strapdown heading sensor 100 based in part on the data signals output from the compass package.

The processing package and the compass package of the combined compass and processing module 300 may be integrated on a single substrate; however, as described above with reference to FIGS. 1-4, the processing package and the compass package may be separate substrates electrically coupled by a cable.

Figure 6:
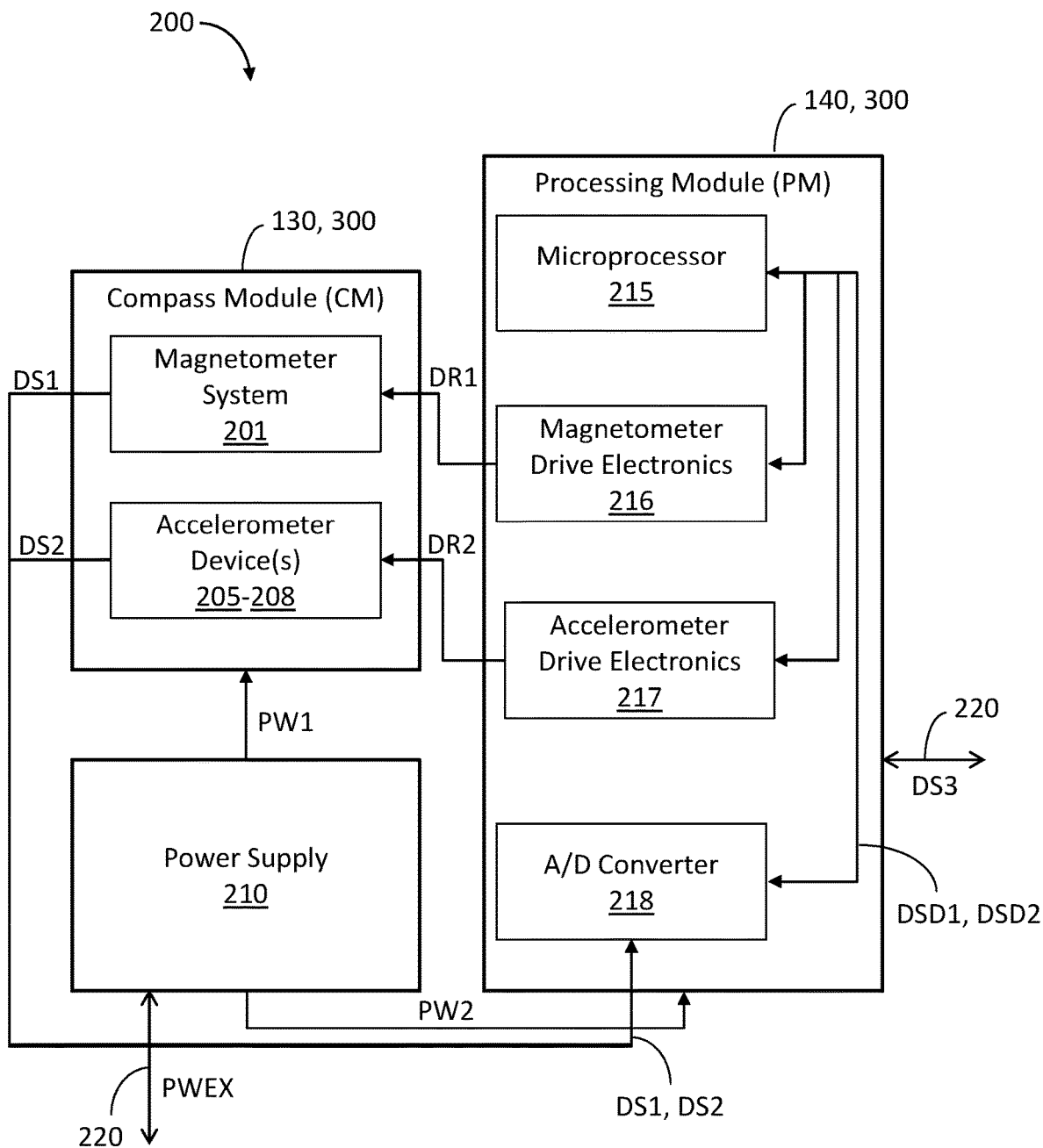
FIG. 6 is a block diagram of a strapdown heading sensor, in accordance with embodiments of the present inventive concepts.

FIG. 6 is a block diagram of a strapdown heading sensor, in accordance with embodiments of the present inventive concepts. The strapdown heading sensors 100 shown and described above with reference to FIGS. 1-5 comprise a control system architecture 200, which will now be described in further detail.

As described above, the compass module 130 or the compass package of the combined compass and processing module 300 may be configured to generate and output data signals DS1 corresponding to a strength and/or direction of the Earth's magnetic field, and may further generate and output data signals DS2 corresponding to a strength and/or direction of gravitational acceleration of the strapdown heading sensor 100. The processing module 140 or the processing package of the combined compass and processing module 300 may be configured to determine at least one of pitch, roll and yaw of the strapdown heading sensor 100 based in part on the data signals DS1, DS2 output from the compass module 130 or the compass package of the combined compass and processing module 300. Data signals DS3 corresponding to pitch, roll and/or yaw may be provided to other systems and devices of a target apparatus via an input/output (I/O) connection 220.

The control system architecture 200 includes a power supply 210, which is configured to convert and/or condition an external current supply PWEX to one or more internal current supplies PW1, PW2. For example, in the embodiment shown in FIG. 6, the power supply 210 supplies a first current supply PW1 to the compass module 130 or the compass package of the combined compass and processing module 300, and further supplies a second current supply PW2 to the processing module 140 or the processing package of the combined compass and processing module 300.

The compass module 130 or the compass package of the combined compass and processing module 300 includes a magnetometer system 201, which may include one or more fluxgate magnetometers, and one or more accelerometers or pairs of accelerometers 205-208. In response to drive signals DR1, DR2 generated by magnetometer drive electronics 216 and accelerometer drive electronics 217 of the processing module 140 or the processing package of the combined compass and processing module 300, the magnetometer system 201 and the one or more accelerometers or pairs of accelerometers 205-208 may generate the output data signals DS1, DS2.

The processing module 140 or the processing package of the combined compass and processing module 300 may include a microprocessing system 215, magnetometer drive electronics 216, accelerometer drive electronics 217 and an analog-to-digital (A/D) converter 218. The A/D converter 218 may receive and process the output data signals DS1, DS2 from the magnetometer system 201 and the one or more accelerometers or pairs of accelerometers 205-208, and may transmit digitized signals DSD1, DSD2 to the microprocessing system 215. The microprocessing system 215 may be configured to control the operation of the strapdown heading sensor 100 so as to generate the data signals DS3, and may further be configured to perform various compensating and calibration routines.

The methods described herein can be implemented by the sensors 100 and/or the control system architectures 200 executing a unique set of instructions stored in memory of the microprocessing system 215. As will be appreciated by those skilled in the art, a unique set of instructions can be implemented or embodied in executable code, such as, software, firmware, machine code or a combination thereof. As such, the unique set of instructions stored in memory transforms the systems and/or architectures into particular, special purpose systems and architectures that can operate, for example, according to the following exemplary flow diagrams.

Figure 7:
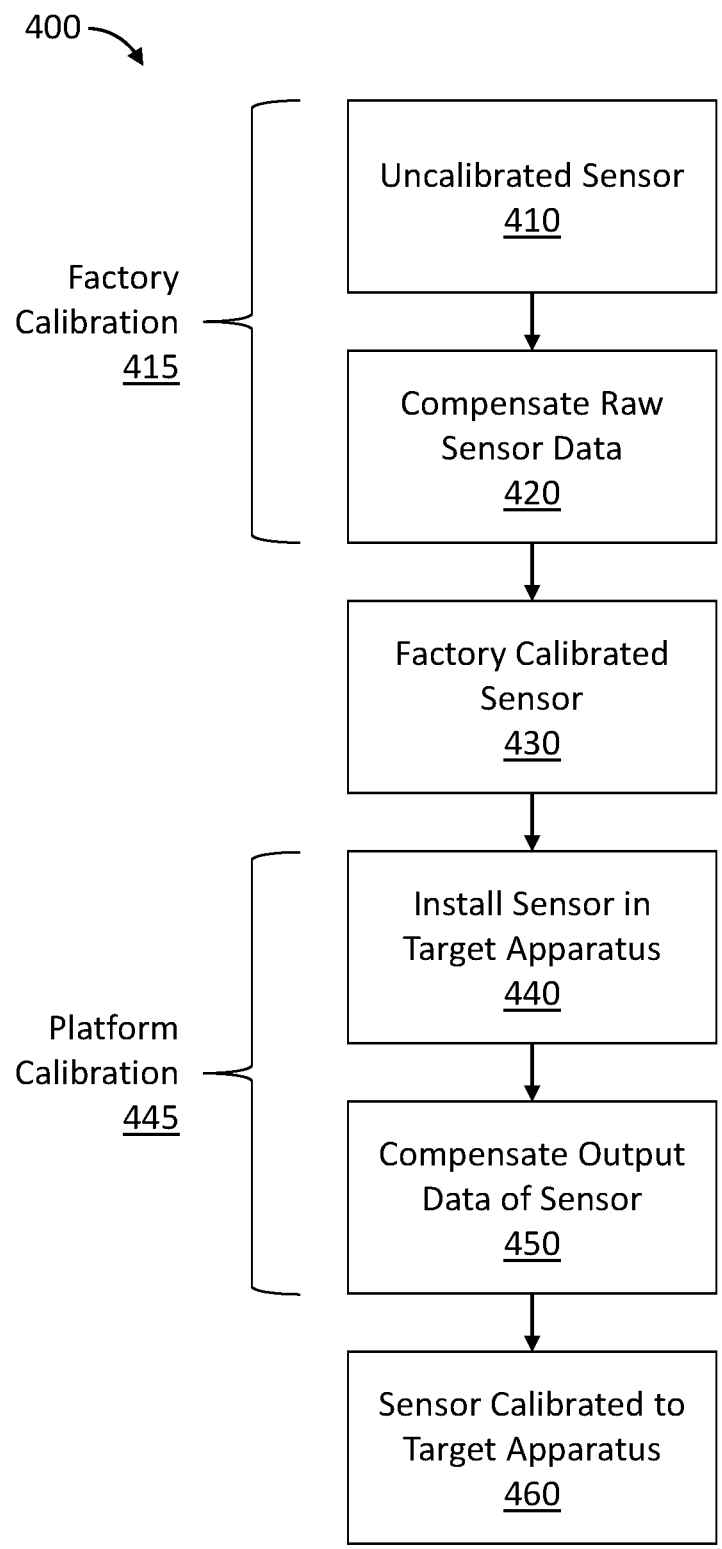
FIGS. 7-9 are flow diagrams of a method of calibrating a strapdown heading sensor, in accordance with embodiments of the present inventive concepts.
Figure 8:
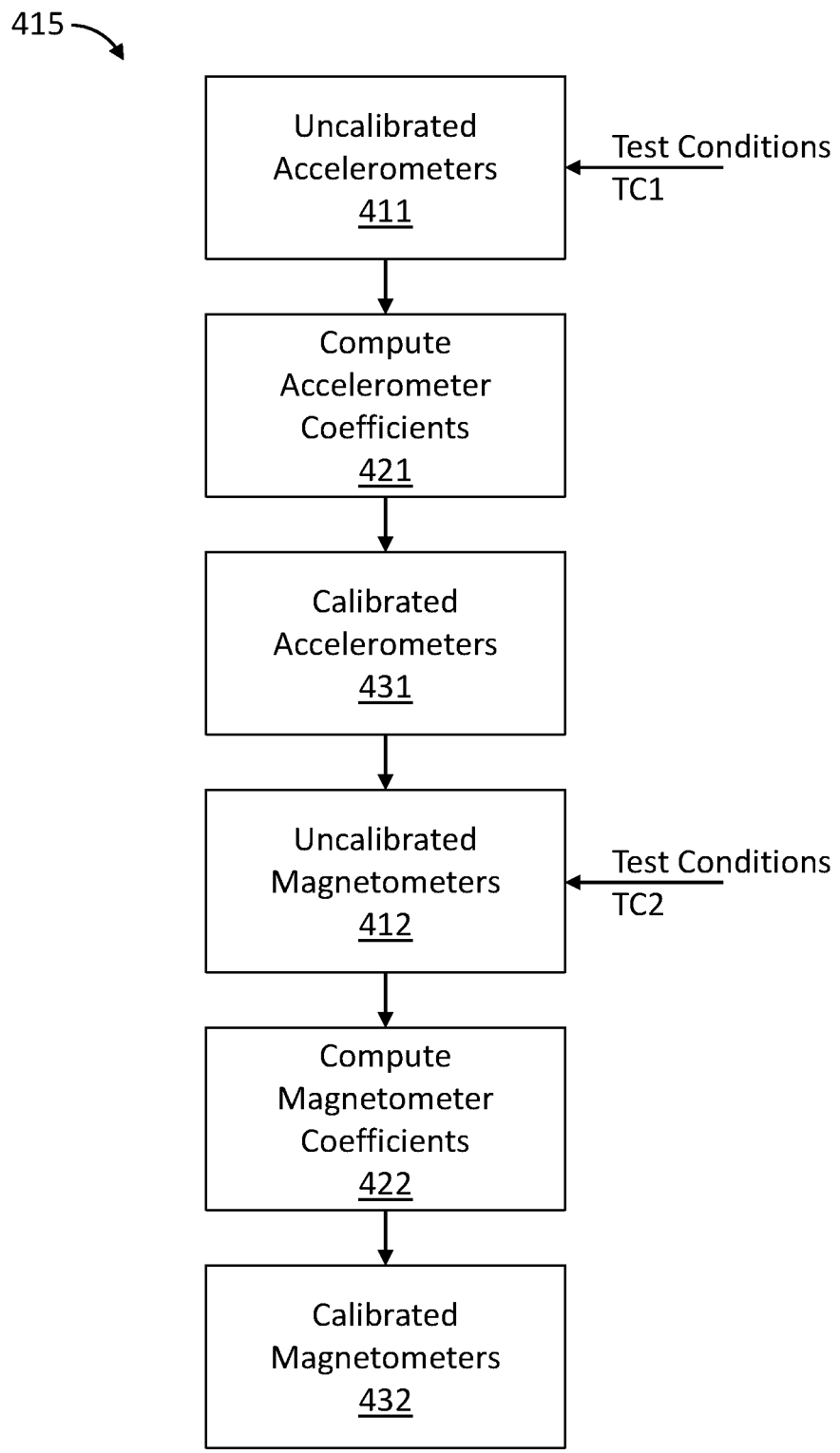
Figure 9:
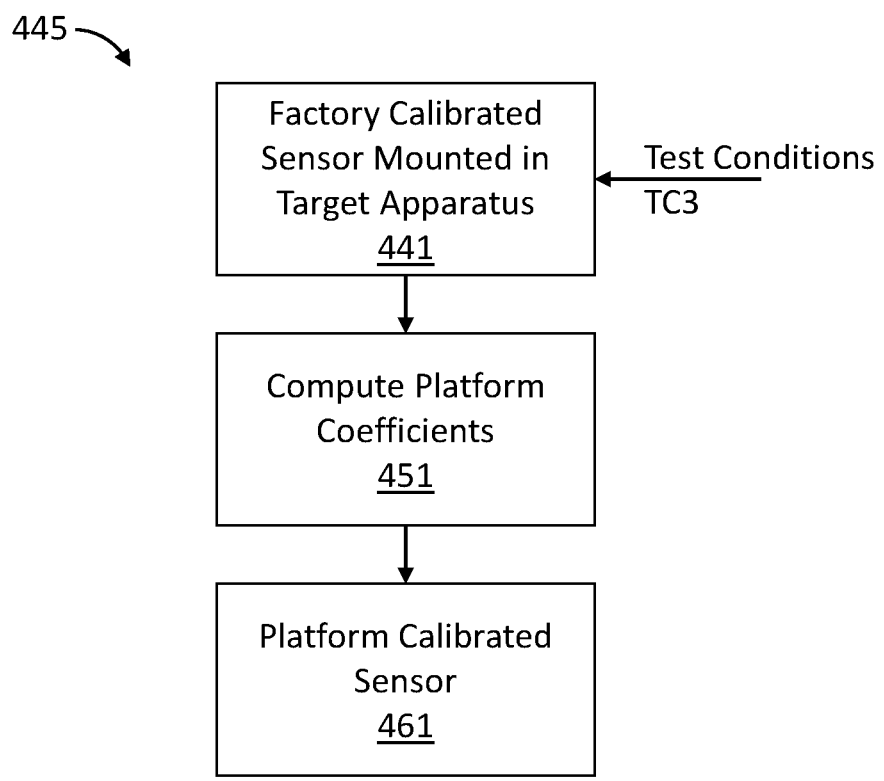

FIGS. 7-9 are flow diagrams of a method of calibrating a strapdown heading sensor, in accordance with embodiments of the present inventive concepts. A strapdown heading sensor 100 may be configured to perform a method of calibration 400 in order to compensate for environmental conditions (e.g., temperature fluctuations) and sensor errors. In addition, the method of calibration 400 may be performed to compensate for a misalignment and/or additional hard/soft iron errors of a strapdown heading sensor 100 mounted within a target apparatus.

TABLE 1

|  | Accelerometers | Magnetometers |
| --- | --- | --- |
| On-axis Errors | Bias/Offset<br>Scale/Gain | Bias/Offset<br>Scale/Gain<br>Hard Iron |
| Intra-axis Errors | Nonorthogonality | Nonorthogonality<br>Soft Iron |
| Intra-sensor Errors | Misalignment | Misalignment |

Table 1 illustrates several types of errors that can affect accelerometer and magnetometer measurements. In addition to temperature fluctuations, the above sensor errors can alter the accuracy of a strapdown heading sensor. To compensate for these errors and others, the method of calibration 400 includes a factory calibration routine 415 and a platform calibration routine 445.

Referring to FIG. 7, during the factory calibration routine 415, an uncalibrated strapdown heading sensor is provided 410, and raw sensor data generated by sensors of the uncalibrated strapdown heading sensor are compensated for errors in the instrument frame of the strapdown heading sensor 420. As a result, a factory calibrated strapdown heading sensor 430 is provided, which is configured to generate data signals (e.g., data signals DS3 of FIG. 6) that are calibrated to the instrument frame of the strapdown heading sensor. As described above, the instrument frame of the strapdown heading sensor may be indicated by an alignment notch (e.g., alignment notch 111 of FIGS. 1-5) in the housing of the strapdown heading sensor.

Following the factory calibration routine 415, a platform calibration routine 445 may be performed. Prior to or at the start of the platform calibration routine 445, the strapdown heading sensor is installed in or mounted to a target apparatus. For example, the strapdown heading sensor may be installed in a towed array 502 (e.g., towed array of FIG. 10) or other device. After installation of the strapdown heading sensor in the target apparatus, the output data of the strapdown heading sensor 100 is compensated for errors in the apparatus frame of the target apparatus relative to the instrument frame of the strapdown heading sensor. As a result, a platform calibrated strapdown heading sensor 460 is provided. A platform calibrated strapdown heading sensor is configured to generate data signals (e.g., data signals DS3 of FIG. 6) that are recalibrated to the apparatus frame of the target apparatus. In this manner, alignment errors and/or additional hard/soft iron errors introduced during the installation or mounting of the strapdown heading sensor can be compensated.

The errors in the instrument frame and/or the apparatus frame of the strapdown heading sensor may include: a misalignment of the sensors mounted within a housing of the strapdown heading sensor, a misalignment of the strapdown heading sensor mounted within the target apparatus, an intra-sensor nonorthogonal error, an inter-sensor nonorthogonal error, a gain error, a bias error and hard/soft iron errors of the sensors of the strapdown heading sensor. These errors may further be affected by other environmental variables, such as temperature.

Various systems and methods of determining compensation coefficients and compensating sensor outputs are known in the art, and may be used in whole or in part with the method of calibration 400 described herein. U.S. Pat. No. 4,698,912, issued on Oct. 13, 1987 and U.S. Pat. No. 7,555,398, issued on Jun. 30, 2009, are each incorporated herein by reference in their entirety. In addition, the journal article titled "Calibration of Strapdown Magnetometers in Magnetic Field Domain", by Demoz Gebre-Egziabher, et al., printed in the Journal of Aerospace Engineering, Vol. 19, No. 2, April 2006, pp. 87-102, is incorporated herein by reference in its entirety. Further, the article titled "Numerical calibration for 3-axis accelerometers and magnetometers", by F. Camps, et al., printed in the Electro/Information Technology, 2009. eit '09. IEEE International Conference, 7-9 Jun. 2009, Print ISBN: 978-1-4244-3354-4, is incorporated herein by reference in its entirety.

Referring to FIG. 8, a factory calibrated strapdown heading sensor is provided as a result of the factory calibration routine 415. During the factory calibration routine 415, accelerometers and magnetometers of the uncalibrated strapdown heading sensor are compensated so that sensor data generated by the strapdown heading sensor corresponds to a physical orientation of the strapdown heading sensor.

To compensate the raw sensor data generated by the sensors 411, 412 of the uncalibrated strapdown heading sensor, test conditions TC1, TC2 are applied to the sensors 411, 412 of the uncalibrated strapdown heading sensor, and compensation coefficients are computed 421, 422 based on the raw sensor data generated by the sensors 411, 412 of the uncalibrated strapdown heading sensor and reference data determined from a known reference source. As a result, calibrated accelerometers and magnetometers are provided 431, 432.

For example, a first set of test conditions TC1 may be applied to the accelerometers 411 of the strapdown heading sensor. In response the first set of test conditions TC1, accelerometer compensation coefficients 421 are computed based on the raw data generated by the accelerometers 411 and reference data determined from a known reference source, such as a known acceleration applied to the accelerometers 411 or a reference sensor.

Further, a second set of test conditions TC2 may be applied to the magnetometers 412 of the strapdown heading sensor. In response the second set of test conditions TC2, magnetometer compensation coefficients 422 are computed based on the raw data generated by the magnetometers 412 and reference data determined from a known reference source. In some embodiments, the reference data may be calculated based on a geographical location of the magnetometers 412, a position of the magnetometers 412 relative to the Earth's magnetic field and/or a reference sensor.

Further, one or more of the following test conditions may be applied to the sensors of the uncalibrated strapdown sensor: varying a temperature of the uncalibrated strapdown sensor, varying an orientation of the uncalibrated strapdown sensor, varying magnetic fields applied to the uncalibrated strapdown heading sensor and altering a position of the uncalibrated strapdown heading sensor so as to affect a gravitational field applied to the uncalibrated strapdown sensor.

Further, during the factory calibration routine 415, the strapdown heading sensor may be configured to convert the compensated sensor data in the instrument frame relative to the strapdown heading sensor to compensated sensor data in the Earth's frame relative to the strapdown heading sensor. As a result, the strapdown heading sensor may output compensated sensor data in the Earth frame relative to the strapdown heading sensor.

Referring to FIG. 9, a platform calibrated strapdown heading sensor is provided as a result of the platform calibration routine 445. During the platform calibration routine 445, the output data of the strapdown heading sensor is compensated for errors in the apparatus frame of the target apparatus so as to provide a platform calibrated strapdown heading sensor.

For example, a third set of test conditions TC3 are provided to the strapdown heading sensor installed in or mounted to a target apparatus 441, and compensation coefficients 451 based on sensor data generated by the strapdown heading sensor and reference data determined from a known reference source are computed so that compensated sensor data is generated by the strapdown heading sensor that corresponds to a physical orientation of the target apparatus. In some embodiments, the reference data may be calculated based on a geographical location of the magnetometers, a position of the magnetometers relative to the Earth's magnetic field, a known acceleration applied to the accelerometers and/or a reference sensor. In this manner, a platform calibrated strapdown heading sensor 461 is provided, which is configured to generate data signals (e.g., data signals DS3 of FIG. 6) corresponding to an attitude of the target apparatus.

FIG. 10 illustrates a towed array, in accordance with embodiments of the present inventive concepts. In this exemplary embodiment, a towed array 502 including a plurality of strapdown heading sensors 100 is shown attached to a surface ship 501. The strapdown heading sensors 100 are configured to determine an attitude of the portion of the towed array 502 to which they are coupled.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A strapdown heading sensor comprising:
   a housing; and
   a compass module at least partially positioned within an inner cavity of the housing, the compass module including a first sensor configured to detect a magnetic field of the Earth and a second sensor configured to detect a gravitational force of the Earth;
   wherein the compass module is structurally isolated from the housing such that the first sensor and the second sensor are passively isolated from at least one of bending and flexing of the housing, wherein an alignment between the first sensor and the second sensor is not disturbed due to the at least one of bending and flexing of the housing.

2. The strapdown heading sensor of claim 1, wherein the housing is an elongated housing.

3. The strapdown heading sensor of claim 1, wherein the compass module is cantilevered within the housing.

4. The strapdown heading sensor of claim 1, wherein an alignment of axes within each of the first sensor and the second sensor is not disturbed due to the at least one of bending and flexing of the housing.

5. The strapdown heading sensor of claim 1, wherein the housing is a closed housing.

6. The strapdown heading sensor of claim 1, wherein the first sensor is a fluxgate magnetometer system.

7. The strapdown heading sensor of claim 6, wherein the fluxgate magnetometer system is a tri-axial system.

8. The strapdown heading sensor of claim 6, wherein the fluxgate magnetometer system includes a plurality of uni-axial fluxgate magnetometers.

9. The strapdown heading sensor of claim 6, wherein the fluxgate magnetometer system includes three uni-axial magnetometers which are transversely arranged to one another.

10. The strapdown heading sensor of claim 6, wherein the fluxgate magnetometer system includes three uni-axial fluxgate magnetometers, each of which is configured to detect a different magnetic field vector.

11. The strapdown heading sensor of claim 1, wherein the second sensor comprises at least one accelerometer.

12. The strapdown heading sensor of claim 11, wherein the at least one accelerometer is a uni-axial accelerometer.

13. The strapdown heading sensor of claim 11, wherein the at least one accelerometer is a plurality of uni-axial accelerometers, the plurality of uni-axial accelerometers being arranged transversely to one another.

14. The strapdown heading sensor of claim 11, wherein the at least one accelerometer is three uni-axial accelerometers, each of which is configured to detect a different acceleration vector.

15. The strapdown heading sensor of claim 11, wherein the at least one accelerometer is a bi-axial accelerometer.

16. The strapdown heading sensor of claim 1, further comprising a processing module operably coupled to the compass module.

17. The strapdown heading sensor of claim 16, wherein the processing module is configured to determine at least one of pitch, roll, and yaw of the strapdown heading sensor based on data from the compass module.

18. The strapdown heading sensor of claim 16, wherein the processing module is coupled to the compass module by a flexible cable.

19. The strapdown heading sensor of claim 16, wherein the processing module is structurally isolated from the compass module.

* * * * *